United States Patent
Mueller

(10) Patent No.: US 9,600,542 B2
(45) Date of Patent: Mar. 21, 2017

(54) FUZZY SUBSTRING SEARCH
(71) Applicant: Gerd Mueller, Waiblingen (DE)
(72) Inventor: Gerd Mueller, Waiblingen (DE)
(73) Assignee: SAP SE, Walldorf (DE)
( * ) Notice: Subject to any disclaimer, the term of this patent is extended or adjusted under 35 U.S.C. 154(b) by 438 days.
(21) Appl. No.: 14/317,731
(22) Filed: Jun. 27, 2014
(65) Prior Publication Data
US 2015/0379127 A1 Dec. 31, 2015
(51) Int. Cl.
*G06F 17/30* (2006.01)
(52) U.S. Cl.
CPC .............................. *G06F 17/30542* (2013.01)
(58) Field of Classification Search
CPC ................................................ G06F 17/30542
USPC ......................................................... 707/741
See application file for complete search history.

(56) References Cited

U.S. PATENT DOCUMENTS

| | | | |
|---|---|---|---|
| 2009/0182554 A1* | 7/2009 | Abraham | G06F 17/2765 704/9 |
| 2009/0319521 A1* | 12/2009 | Groeneveld | G06F 17/30864 |
| 2015/0347422 A1* | 12/2015 | Fadel | G06F 17/30389 707/767 |

OTHER PUBLICATIONS

Wikipedia contributors. "Levenshtein distance." Wikipedia, The Free Encyclopedia. Wikipedia, The Free Encyclopedia, May 15, 2016;—https://en.wikipedia.org/wiki/Levenshtein_distance ; Web. Jun. 10, 2016.
Website: The GITS Blog: Random scribbling about programming, translation, and Japan; "*Fuzzy substring matching with Levenshtein distance in Python*", http://ginstrom.com/scribbles/2007/12/01/fuzzy-substring-matching-with-levenshtein-distance-in-python/ ; Web. Jun. 10, 2016.
Wikipedia contributors. "Approximate string matching." Wikipedia, The Free Encyclopedia. Wikipedia, The Free Encyclopedia, May 15, 2016;—https://en.wikipedia.org/wiki/Approximate_string_matching ; Web. Jun. 10, 2016.

* cited by examiner

*Primary Examiner* — Rehana Perveen
*Assistant Examiner* — Hicham Skhoun
(74) *Attorney, Agent, or Firm* — Fish & Richardson P.C.

(57) ABSTRACT

The present disclosure describes methods, systems, and computer program products for performing fuzzy substring search. One computer-implemented method includes determining, by operation of a hardware processor, one or more tokens of an input string received from a client application, identifying, from a database, a reference string based on the one or more tokens of the input string, determining a plurality of character index values of the reference string, each character index value indicating a position of a character in the reference string, determining one or more hop index values of the input string, each hop index value indicating a position of a separator in the input string, and calculating a similarity score of the reference string relative to the input string based on the plurality of character index values of the reference string and the one or more hop index values of the input string.

15 Claims, 4 Drawing Sheets

FUZZY SUBSTRING SEARCH

BACKGROUND

A fuzzy search is a process that locates results that are likely to be relevant to an input search argument even when the argument does not exactly correspond to the desired information (e.g., due to typographical errors). A fuzzy search can return a list of candidates based on likely relevance even though words and spellings contained in the candidates may not exactly match the input search argument. Fuzzy search can be based on n-gram matching (e.g., 1-grams and 2-grams) that is fast and gives good results when searching for strings that have about the same length as the user input. An n-gram is a contiguous sequence of n items from a given sequence of text or speech. An n-gram matching algorithm can search for strings that match the n items contained in the n-gram.

SUMMARY

The present disclosure relates to computer-implemented methods, computer-readable media, and computer systems for performing fuzzy substring search. One computer-implemented method includes determining, by operation of a hardware processor, one or more tokens of an input string received from a client application, identifying, from a database, a reference string based on the one or more tokens of the input string, determining a plurality of character index values of the reference string, each character index value indicating a position of a character in the reference string, determining one or more hop index values of the input string, each hop index value indicating a position of a separator in the input string, and calculating a similarity score of the reference string relative to the input string based on the plurality of character index values of the reference string and the one or more hop index values of the input string.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, comprising, for each of the one or more tokens of the input string, storing one or more of the token itself, a character length of the token, a number of allowed errors for the token, or a flag to indicate whether the token is truncated.

A second aspect, combinable with any of the previous aspects, wherein identifying a reference string comprises selecting a plurality of reference strings from the database based on the one or more tokens of the input string.

A third aspect, combinable with any of the previous aspects, wherein calculating the similarity score of the reference string relative to the input string comprises identifying a path within the reference string corresponding to each of the one or more tokens of the input string, calculating a token score of the path, and calculating the similarity score of the reference string based on the token score of the path.

A fourth aspect, combinable with any of the previous aspects, wherein calculating a token score of the path comprises identifying a number of character errors and a number of hop errors of the path within the reference string relative to the token of the input string, and calculating the token score of the path based on the number of character errors and the number of hop errors.

A fifth aspect, combinable with any of the previous aspects, wherein identifying a path comprises identifying a sequence of character index values of the reference string corresponding to characters of the token.

A sixth aspect, combinable with any of the previous aspects, wherein identifying a path corresponding to each of the one or more tokens of the input string comprises, identifying a plurality of paths within the reference string for each of the one or more tokens in the input string, calculating a score for each of the path, and selecting a path with the best score among the plurality of paths.

The subject matter described in this specification can be implemented in particular implementations so as to realize one or more of the following advantages. First, better substring search results can be obtained. Expected misspelled results can be captured and false positives can be reduced and/or avoided. Second, longer strings are supported. For example, the substring search is available for NVARCHAR columns of all sizes, so the maximum string length that is supported is 5000 characters. Third, various search parameters and score parameters (e.g., the maximum length of input string, the maximum allowed errors, etc.) are optimized for performance enhancement (e.g., algorithm efficiency, selecting the best candidate). Fourth, the search parameters and score parameters are configurable, improving flexibility in adjusting and/or balancing between the exhaustiveness of the search result and the response time, especially for different client applications and different hardware/software configurations. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

When doing a fuzzy substring search, the user enters a short string and searches for strings of the same or longer length that contain a substring similar to the user input. A substring search algorithm can include a two-step approach to process a query: a fuzzy search (e.g., based on based on n-gram matching) to identify a small set of candidates and a detailed analysis of the small number of candidates to remove unwanted rows and to calculate the scores of the expected records.

A search based on, for example, 2-grams will return a large number of false positives because it is likely that most 2-grams of the short user input occur in a large number of long strings that do not contain the word the user entered. For example, when the user searches for "stream," the 2-grams are "st", "tr", "re", "ea", and "am." The string "Two streams and a tree" contains all 2-grams and is an expected result. The string "A strdam" contains a spelling error, so two 2-grams are missing. But it is still an expected result of the fuzzy substring search. The string "Tracy stops at 10 am in this area" also contains all 2-grams but is a false positive because the 2-grams are not near to each other.

This disclosure generally describes computer-implemented methods, computer-program products, and systems for performing fuzzy substring search can avoid false positives and capture expected results in the result set. The example fuzzy substring search described herein is available for NVARCHAR columns of all sizes, supporting up to 5000 characters in string length. Additional or different types of data structures can be supported. A generic mechanism is described in the context of example client/server architecture, for example, including receiving an input string from a client application and returning multiple qualified results with quantitative relevance scores (or similarity scores) corresponding to the input string. The simplified example client/server architecture is provided for reasons of explanation and understanding and is not meant to limit the concepts to the provided examples.

Figure 1:
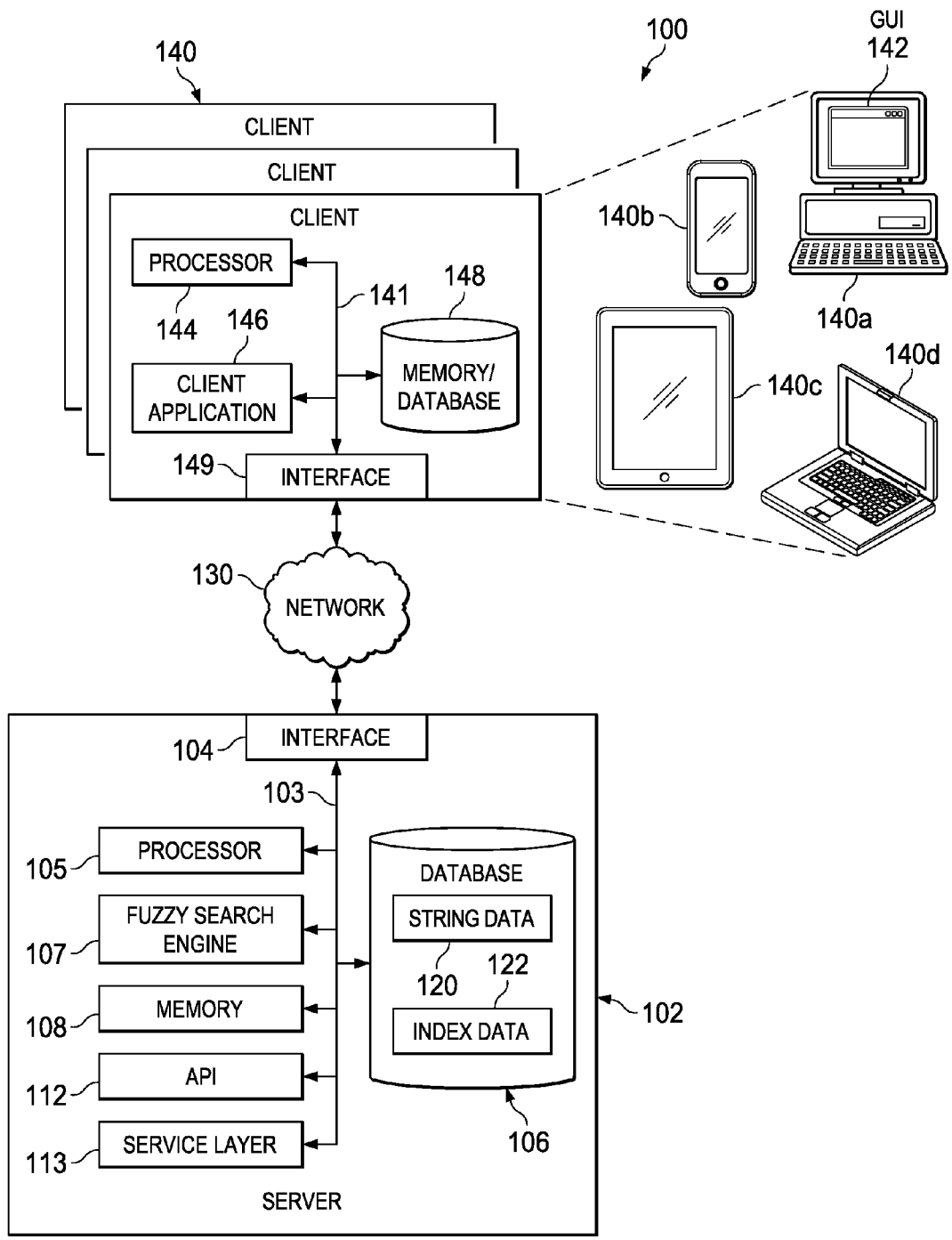
FIG. 1 is a block diagram illustrating an example distributed computing system (EDCS) for performing fuzzy substring search according to an implementation.

FIG. 1 is a block diagram illustrating an example distributed computing system (EDCS) 100 for performing fuzzy substring search according to an implementation. The illustrated EDCS 100 includes or is communicably coupled with a server 102 and a client 140 that communicate across a network 130. In some implementations, one or more components of the EDCS 100 may be configured to operate within a cloud-computing-based environment.

At a high level, the server 102 is an electronic computing device operable to receive, transmit, process, store, or manage data and information associated with the EDCS 100. In general, the server 102 provides functionality appropriate to a server, including database functionality and receiving/serving information and/or functionality from/to a client permitting, for example, fuzzy substring search as described herein. According to some implementations, the server 102 may also include or be communicably coupled with an e-mail server, a web server, a caching server, a streaming data server, a business intelligence (BI) server, and/or other server.

The server 102 is responsible for receiving, among other things, search requests, input strings, and/or search criteria from one or more client applications 146 associated with the client 140 of the EDCS 100. The server 102 can respond to received search requests, for example, by processing the search request and input strings by a fuzzy search engine 107 and performing fuzzy search in database 106.

In addition to requests received from the client 140, search requests may also be sent to the server 102 from internal users, external or third-parties, other automated applications, as well as any other appropriate entities, individuals, systems, or computers. In some implementations, various requests can be sent directly to server 102 from a user accessing server 102 directly (e.g., from a server command console or by other appropriate access method).

Each of the components of the server 102 can communicate using a system bus 103. In some implementations, any and/or all the components of the server 102, both hardware and/or software, may interface with each other and/or the interface 104 over the system bus 103 using an application programming interface (API) 112 and/or a service layer 113. The API 112 may include specifications for routines, data structures, and object classes. The API 112 may be either computer-language independent or dependent and refer to a complete interface, a single function, or even a set of APIs. The service layer 113 provides software services to the EDCS 100. The functionality of the server 102 may be accessible for all service consumers using this service layer. Software services, such as those provided by the service layer 113, provide reusable, defined business functionalities through a defined interface. For example, the interface may be software written in JAVA, C++, or other suitable language providing data in extensible markup language (XML) format or other suitable format.

While illustrated as an integrated component of the server 102 in the EDCS 100, alternative implementations may illustrate the API 112 and/or the service layer 113 as stand-alone components in relation to other components of the EDCS 100. Moreover, any or all parts of the API 112 and/or the service layer 113 may be implemented as child or sub-modules of another software module, enterprise application, or hardware module without departing from the scope of this disclosure. For example, the API 112 could be integrated into the database 106, the server application (e.g., fuzzy search engine) 107, and/or wholly or partially in other components of server 102 (whether or not illustrated).

The server 102 includes an interface 104. Although illustrated as a single interface 104 in FIG. 1, two or more interfaces 104 may be used according to particular needs, desires, or particular implementations of the EDCS 100. The interface 104 is used by the server 102 for communicating with other systems in a distributed environment—including within the EDCS 100—connected to the network 130; for example, the client 140 as well as other systems communicably coupled to the network 130 (whether illustrated or not). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated EDCS 100.

The server 102 includes a processor 105. Although illustrated as a single processor 105 in FIG. 1, two or more processors may be used according to particular needs, desires, or particular implementations of the EDCS 100.

Generally, the processor 105 executes instructions and manipulates data to perform the operations of the server 102. Specifically, the processor 105 executes the functionality required for performing fuzzy substring search.

The server 102 also includes a database 106 that holds data for the server 102, client 140, and/or other components of the EDCS 100. Although illustrated as a single database 106 in FIG. 1, two or more databases may be used according to particular needs, desires, or particular implementations of the EDCS 100. While database 106 is illustrated as an integral component of the server 102, in alternative implementations, database 106 can be external to the server 102 and/or the EDCS 100. Database 106 can include an in-memory database, a traditional database, or a combination thereof. In some implementations, database 106 can be configured to store one or more instances of reference string data 120, index data 122, and/or other appropriate data (e.g., user profiles, objects and content, client data, etc. —whether or not illustrated).

The string data 120 can be any data representing input strings, reference strings, or other strings associated with a fuzzy substring search. The input string can be received, for example, from a client application 146 associated with a client 140, a server application (e.g., fuzzy search engine 107), or from another resource. The input string can be divided or otherwise tokenized into one or more tokens or substrings. Reference strings can include strings, for example, pre-selected in a subset of the database 106 based on an input string. Each input string can correspond to multiple reference strings. The string data 120 can include the string and the token themselves, and any attributes or parameters (e.g., characters, separators, length, errors, the number of allowed errors, sores, etc.) associated with the input string, tokens, and reference strings.

String data 120 can be represented by any suitable data structure appropriate for the hardware and/or software used in the client/server architecture. In other words, the string data 120 is platform agnostic. For example, in some implementations, JAVASCRIPT Object Notation (JSON) models can be used for string data 120 information structures. In some implementations, the string data 120 can be converted to another format either by a server 102 or a client 140 if necessary (e.g., the string data 120 crosses a boundary of one type of network into another and the data structure needs conversion).

The index data 122 includes any data structure appropriate to represent one or more index values (or positions) of characters and separators of the string data 120 and/or any other data. For example, the index data 122 can include a character index value of each character in a reference string, a hop index value of each separator in an input string, or any other index values. In some implementations, the index data 122 can be used to determine errors or mismatches between a reference string and an input string, scores of the reference string, and any other data consistent with this disclosure.

The fuzzy search engine 107, an example server application, is an algorithmic software engine capable of performing, among other things, a fuzzy substring search and any appropriate function consistent with this disclosure for the server 102. In some implementations, the fuzzy search engine 107 can be used for functions particular to the server 102 and/or one or more clients 140 (e.g., receiving search request from, processing the search, and/or transmitting search result to a client 140). In some implementations, the fuzzy search engine 107 can perform searches requested by and/or made available to other components of the EDCS 100. In other words, the fuzzy search engine 107 can act in conjunction with one or more other components of the server 102 and/or EDCS 100 in responding to a search request received from the client 140.

In some implementations, besides fuzzy search engine 107, the server 102 can include other server applications (not shown). In addition, although illustrated as integral to the server 102, in alternative implementations, the fuzzy search engine 107 can be external to the server 102 and/or the EDCS 100 (e.g., wholly or partially executing on the client 140, other server 102 (not illustrated), etc.). In some implementations, the fuzzy search engine 107 may be a network-based, web-based, and/or other suitable application consistent with this disclosure.

In some implementations, a particular fuzzy search engine 107 may operate in response to and in connection with at least one request received from a client application 146, other server applications (not shown), other components (e.g., software and/or hardware modules) associated with another server 102, and/or other components of the EDCS 100. In some implementations, the fuzzy search engine 107 can be accessed and executed in a cloud-based computing environment using the network 130. In some implementations, a portion of a particular fuzzy search engine 107 may be a web service associated with the fuzzy search engine 107 that is remotely called, while another portion of the fuzzy search engine 107 may be an interface object or agent bundled for processing by any suitable component of the EDCS 100. Moreover, any or all of a particular fuzzy search engine 107 may be a child or sub-module of another software module or application (not illustrated) without departing from the scope of this disclosure. Still further, portions of the particular fuzzy search engine 107 may be executed or accessed by a user working directly at the server 102, as well as remotely at a corresponding client 140. In some implementations, the server 102 or any suitable component of server 102 or the EDCS 100 can execute the fuzzy search engine 107.

The memory 108 typically stores objects and/or data associated with the purposes of the server 102 but may also be used in conjunction with the database 106 to store, transfer, manipulate, etc. objects and/or data. In some implementations, the database 106 or part of the database 106 can be in-memory database. The memory 108 can also consistent with other memories within the EDCS 100 and be used to store data similar to that stored in the other memories of the EDCS 100 for purposes such as backup, caching, and/or other purposes.

The client 140 may be any computing device operable to connect to and/or communicate with at least the server 102. In general, the client 140 comprises an electronic computing device operable to receive, transmit, process, and store any appropriate data associated with the EDCS 100, for example, the fuzzy search engine 107. More particularly, among other things, the client 140 can receive inputs and requests from users via user interfaces and transmit the inputs and requests to the server 102 for integration/processing into/by the fuzzy search engine 107 and/or other server applications. The client typically includes a processor 144, a client application 146, a memory/database 148, and/or an interface 149 interfacing over a system bus 141.

In some implementations, the client application 146 can use parameters, metadata, and other information received at launch to access a particular set of data from the server 102 and/or other components of the EDCS 100. Once a particular client application 146 is launched, a user may interactively process a task, event, or other information associated with the server 102 and/or other components of the EDCS 100.

For example, the client application 146 can generate and transmit a particular database request to the server 102.

The client application 146 is any type of application that allows the client 140 to navigate to/from, request, view, create, edit, delete, administer, and/or manipulate content associated with the server 102 and/or the client 140. For example, the client application 146 can present GUI displays and associated data (e.g., search requests and input data from one or more other clients 140, search results generated/transmitted by the server 102) to a user.

Further, although illustrated as a single client application 146, the client application 146 may be implemented as multiple client applications in the client 140. For example, there may be a native client application and a web-based (e.g., HTML) client application depending upon the particular needs of the client 140 and/or the EDCS 100.

The interface 149 is used by the client 140 for communicating with other computing systems in a distributed computing system environment, including within the EDCS 100, using network 130. For example, the client 140 uses the interface to communicate with a server 102 as well as other systems (not illustrated) that can be communicably coupled to the network 130. The interface 149 may be consistent with the above-described interface 104 of the server 102. The processor 144 may be consistent with the above-described processor 105 of the server 102. Specifically, the processor 144 executes instructions and manipulates data to perform the operations of the client 140, including the functionality required to send requests to the server 102 and to receive and process responses from the server 102.

The memory/database 148 typically stores objects and/or data associated with the purposes of the client 140 but may also be consistent with the above-described database 106 and/or memory 108 of the server 102 or other memories within the EDCS 100 and be used to store data similar to that stored in the other memories of the EDCS 100 for purposes such as backup, caching, and the like. Although illustrated as a combined memory/database, in some implementations, the memory and database can be separated (e.g., as in the server 102).

Further, the illustrated client 140 includes a GUI 142 that interfaces with at least a portion of the EDCS 100 for any suitable purpose. For example, the GUI 142 (illustrated as associated with client 140a) may be used to view data associated with the client 140, the server 102, or any other component of the EDCS 100. In particular, in some implementations, the client application 146 may render GUI interfaces or search results received from the fuzzy search engine 107 and/or data retrieved from any element of the EDCS 100.

There may be any number of clients 140 associated with, or external to, the EDCS 100. For example, while the illustrated EDCS 100 includes one client 140 communicably coupled to the server 102 using network 130, alternative implementations of the EDCS 100 may include any number of clients 140 suitable to the purposes of the EDCS 100. Additionally, there may also be one or more additional clients 140 external to the illustrated portion of the EDCS 100 that are capable of interacting with the EDCS 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 (example configurations illustrated as 140a-140d) is intended to encompass any computing device such as a desktop computer/server, laptop/notebook computer, wireless data port, smart phone, personal data assistant (PDA), tablet computing device, one or more processors within these devices, or any other suitable processing device. For example, the client 140 may comprise a computer that includes an input device, such as a keypad, touch screen, or other device that can accept user information, and an output device that conveys information associated with the operation of the server 102 or the client 140 itself, including digital data, visual and/or audio information, or a GUI 142 (illustrated by way of example only with respect to the client 140a).

Figure 2:
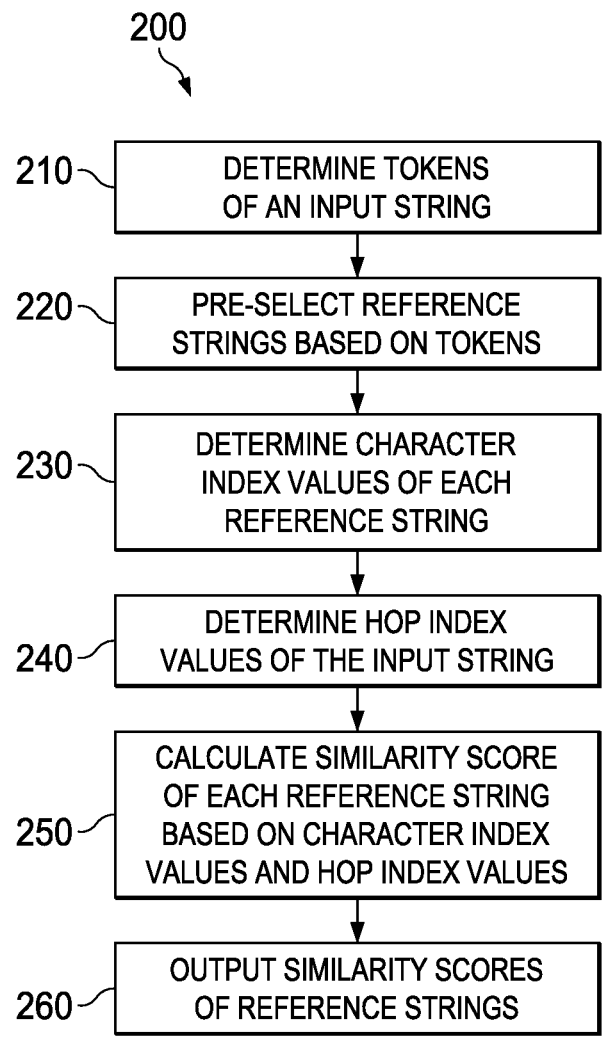
FIG. 2 is a flow chart illustrating a method for performing fuzzy substring search according to an implementation.

FIG. 2 is a flow chart 200 illustrating a method 200 for performing fuzzy substring search according to an implementation. For clarity of presentation, the description that follows generally describes method 200 in the context of FIG. 1. However, it will be understood that method 200 may be performed, for example, by any other suitable system, environment, software, and hardware, or a combination of systems, environments, software, and hardware as appropriate. In some implementations, various steps of method 200 can be run in parallel, in combination, in loops, and/or in any order.

At 210, one or more tokens of an input string can be determined. The input string can be received, for example, by the fuzzy search engine 107 of the server 102 from a client application 146 associated with a client 140. The input string can be included in a search request and can be used to find strings that are the same or similar to the input string in a database. The input string can include one or more characters and separators. The characters can include any letter, numeral, or other symbols. In some implementations, to facilitate comparisons, all characters can be lower-cased (or upper-cased) and, for example, German umlauts (ä, ö, ü, β) can be replaced by two Latin letters (ae, oe, ue, ss). Separators can include punctuation or other indicators such as, for example, "<TAB>,;:-_!' '"'$%&/( )=?"."

The input string can be divided or tokenized into one or more tokens (or substrings), split into separate tokens separated by separators. For example, if the input string is "albia city," two tokens "albia" and "city" can be identified as they are separated by a space. In some implementations, additional or different rules (e.g., example rules described at 310 of the example method 300 of FIG. 3) can be configured to identify tokens out of an input string.

In some implementations, an unsigned integer ("int") can be used to represent a character. This allows working with Unicode characters.

For each token, the following information can be stored:
The token itself
The length in characters
The number of allowed errors for this token
A flag to indicate whether the token was truncated to the maximal number of characters (e.g., 100 or another number)

Each distinct input character can be stored in a dedicated container, e.g., inputCharacters. The length of the input string (including separators) can be stored.

The number of allowed errors (e.g., allowedErrors) for a token can be calculated, for example, according to:
The number of allowedErrors is $$\frac{\text{number of characters}}{4},$$

decimals truncated
   Maximum of allowedErrors is 8
   Minimum of allowedErrors is 1, except tokens with one or two characters length have 0 allowedErrors In some implementations, the above parameters can be set as the default values of associate with the number of allowed error. In some implementations, the above parameters can be modified or configured in another manner, for example, based on computational capacity of the system, tolerable response time, search criteria specified by the user, and/or other factors.

In some implementations, the input tokens are then sorted in descending order according to their lengths. Every token has to appear in the reference string with at most allowedErrors errors.

In some implementations, the minimum score for the fuzzy pre-select can be calculated. This is the value of the minFuzziness that the fuzzy search will be performed with. This calculation can depend on the lengths of the tokens and the number of tokens. A higher minFuzziness value leads to a smaller number of pre-select candidates, which means a better performance. In some instances, it is important to have the highest possible value without missing relevant candidates.

The fuzzy minimum score can be calculated, for example, according to equation (1):

$$fms = \frac{2\ length_{input} - [3\sum_{i=1}^{n} allowedErrors_i + shortTokens + (n-1)]}{2\ length_{input}} \quad (1)$$

where
   $length_{input} \triangleq$ length of the input string including separators
   $n \triangleq$ number of tokens
   $shortTokens \triangleq$ number of tokens with length<3

In some implementations, the fuzzy minimum score can be limited to at least 0.6. Other implementations can use higher or lower fuzzy minimum scores.

In the above "albia city" example, token attributes determined based on the above-mentioned rules are shown in Table 1, and attributes of the input string are shown in Table 2.

TABLE 1

Example Token Attributes

| token | allowedErrors | length | truncated |
|---|---|---|---|
| albia | 1 | 5 | false |
| city | 1 | 4 | false |

TABLE 2

Example Input String Attributes

| inputLength | 10 | | | | | |
|---|---|---|---|---|---|---|
| fuzzyMinScore | 0.65 | | | | | |
| inputCharacters | a | l | b | i | c | t | y |

At 220, one or more reference strings are identified based on the one or more tokens of the input string. For example, the one or more reference strings can be identified by the fuzzy search engine 107 from the database 106. The reference strings can be identified, for example, based on the one or more tokens of the input string according to fuzzy pre-selection algorithms such as n-gram matching algorithms. The pre-selection can be performed, for example, based on a subset of the database that the fuzzy substring database is performed. In some implementations, the fuzzy pre-select can return a number of result candidates, which can be identifier (IDs) to the underlying dictionary. For each of these IDs, the dictionary string (i.e., the reference string) can be retrieved, processed, and later compared to the input string.

For example, "albion city" can be an example reference string of the input string "albia city." In some instances, the lower case reference string can also be converted like the input string (e.g., converted German umlauts). The entire reference string can be treated as a string, containing no separators.

At 230, one or more character index values of the reference string are determined, for example, by the fuzzy search engine 107. Each character index value indicates a position of a character in the reference string. In some implementations, the position (or index value) of each reference character that is also contained in the input string can be stored in a list for the respective character. The index values are from the reference string without separators (e.g., "albioncity").

For example, the determined character index values of the example reference string "albion city" are shown in Table 3. The bolded characters and their respective index values are stored while the un-bolded characters and index values are characters do not appear in the input string "albia city."

TABLE 3

Example Character Index Values of Reference String

| a | l | b | i | o | n | c | t | y |
|---|---|---|---|---|---|---|---|---|
| 0 | 1 | 2 | 3 7 | 4 | 5 | 6 | 8 | 9 |

At 240, one or more hop index values of the input string are determined for example, by the fuzzy search engine 107. Each hop index value indicates a position of a separator in the input string. For example, the hop index values can be the positions which character positions are preceded by one or more separators, and can be stored in a container or any appropriate data structure. The separators can also include the beginning and end of an input string. For example, hop index value can include the positions 0 and end+1 to mark the separator at the start and the end of the input string. Table 4 shows example hop index values of the example input string "albia city," where the first character "a" is given a position or index value "0."

TABLE 4

Example Hop Index Values of Input String

| Hop index values | 0 | 6 | 10 |
|---|---|---|---|

At 250, a similarity score of the reference string to the input string is calculated, for example, by the fuzzy search engine 107, based on the character index values of the reference string and the one or more hop index values of the input string. The similarity score can be used to sort and select the best reference string for each input string. In some implementations, the similarity score are calculated based on a comparison between the reference string and the input string. Missing or wrong characters count as errors. Separators within the token in the reference count as a hop (counts twice). Missing separators at the beginning or the end of the reference token also count as hops (counts once each). The comparison can be implemented based on the character index values of the reference string and the one or more hop index values of the input string.

In some implementations, calculating a similarity score of a reference string relative to an input string can include finding the best representation (or path) in the reference string for each input token. In some instances, this can be a recursive process that runs as long as it has found the best assignment for each token.

In some implementations, it can be configured that already assigned characters cannot be again assigned for a different token—this is called the strict-and behaviour. There can be situations where the algorithm does not assign the best possible combinations. Already assigned characters are not considered to be re-assigned to a new token even when this would solve this problem. For example, given an input string "bitteren ende," if the algorithm assigns "bitteren" to "bitter en" and it cannot assign the second input token "ende" since there are only the characters "de" left (which would mean two errors, resulting in a score of 0). The perfect solution for this case would be: "bitteren"→"bitter" (2 errors, which is ok, since allowedErrors=2 for the length of 8 characters). And the perfect second token for "ende" would be "ende."

Figure 3:
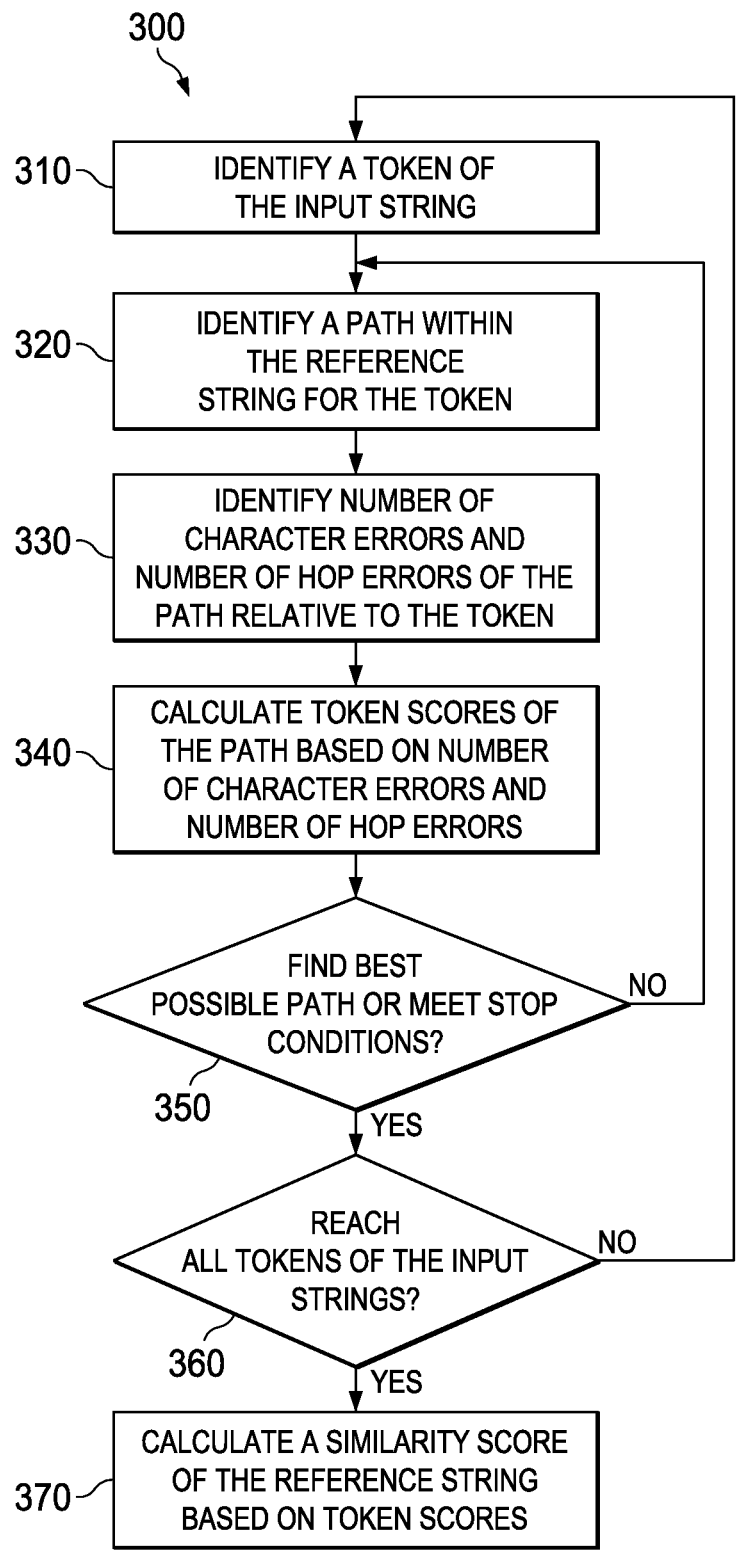
FIG. 3 is a flow chart illustrating a method for calculating a similarity score of a reference string relative to an input string according to an implementation.

FIG. 3 details an example method 300 for calculating a similarity score of a reference string relative to an input string. Referring now to FIG. 3, at 310, a token of the input string is identified. In some instances, an input string can include more than one token. In some implementations, the example method 300 can start with the longest token from input string and proceed to shorter tokens, or the example method 300 can proceed in another manner.

At 320, a path within the reference string is identified for the identified token. A path can include a sequence of character index values of the reference string corresponding to the identified token. For example, the path can be identified by searching a matching character within the reference string (e.g., from left to right) for each character in each token of the input string (e.g., from left to right, respectively). A perfect path can be a sequence of successive character index values (of the reference string) corresponding to the characters from left to the right for each token.

In some implementations, searching for the best path for the identified token can be a recursive process. For each entry of an identified path (e.g., upon identifying a character of the reference string), a current score of the path is calculated (based on errors and hops). This calculated score is used to base decisions on, for example, whether to proceed with a path or try an alternative path.

Several scenarios can occur when search for a path, based on a token, within the reference string. For example, if a character of the token is found at a current position of the reference string (which implies the current position or index value belongs to the perfect path), the next character at the next position of the reference string is checked (marked as case[1]). If the character of the token is not found at the current position of the reference string, three alternatives can be checked:

Case[2]: Look for the same character at the next position of the reference string Case[3]: Look for the next character of the token at the next position of the reference string Case[4]: Look for the next character of the token at this position of the reference string At 330, the number of character errors and the number of hop errors of the identified path relative to the token are identified. A character error can be, for example, a character mismatch between the character in the path and the character of the token and missing a character of a character of the token. A hop error is an error associated with separators. For example, hops or separators are expected at the beginning and the end of a token. Hops are not expected within a token. If there is no hop at the beginning or the end, it counts as one hop error, each. If there is a hop within a token, it counts as two hop errors. Hop errors does not count as errors in the sense of missing or wrong characters, but are merely used to influence the hop factor for calculating the similarity score. In some implementations, no result is thrown away due to hop errors; the hop errors only reduce the score.

In the example reference string "albion city" for the input string "albia city," Tables 5 and 6 shows the identified paths for the two tokens "albia" and "city," respectively. For the first token "albia," the identified path includes a sequence of character index values: 0 1 2 3 0 4, which is a non-decreasing successive sequence except for the second index value "0" corresponding to the second character "a" appearing in the reference string but not in the input string. As such, a character error is identified. The start index value can be configured as the index value of the first character of the identified path ("a" in this case), while the end index can be configured as the index value of the last matched character of the identified path that plus 1 ("3"+1=4). The start index value and end index value of the identified path can be compared with the hop index value of the input string (see e.g., Table 4) to determine the hop errors. In this case, the end index value of the first token "albia" is "4" for the identified path, rather than "6" of the input string, therefore there is one hop error. Similar analysis can be performed for the second token "city" and corresponding results are shown in Table 6. Note that the index value "3" for character "i" has already been used for the first token "albia" and thus only the remaining index value "7" for character "i" can be used for the second token "city."

TABLE 5

Example Identified Path and Errors for Token "albia"

| input token | a | l | b | i | a | end |
|---|---|---|---|---|---|---|
| reference indexes (Path) | 0 | 1 | 2 | 3 7 | 0 | 4 |
| character errors |  |  |  | 1 |  |  |
| start index |  |  |  | 0 |  |  |
| end index |  |  |  | 4 |  |  |

TABLE 6

Example Identified Path and Errors for Token "city"

| input token | c | i | t | y | end |
|---|---|---|---|---|---|
| reference indexes (Path) | 6 | 3 7 | 8 | 9 | 10 |
| character errors |  |  | 0 |  |  |

TABLE 6-continued

Example Identified Path and Errors for Token "city"

| input token | c | i | t | y | end |
|---|---|---|---|---|---|
| start index | | | 6 | | |
| end index | | | 10 | | |

At 340, for each token, a token score of the identified path is calculated based on the number of character errors and the number of hop errors. The token score can depend on a character factor and a hop factor that relates to the number of character error and the number of hop errors, respectively. For example, the character factor can be calculated based on the character errors according to Equation (2):

$$tokenFactor_{errors} = score_{base} + \left(1 - \frac{errors_{token}}{allowedErrors_{token}}\right) \times (1 - score_{base}) \quad (2)$$

where $score_{base}$ can be configured to be 0.8, or another value; $errors_{token}$ represents the number of character errors in the identified path for the token; and $allowedErrors_{token}$ represents the number of allowed errors for the token, which can be the number of characters of the token/4, or otherwise configured.

The hop factor can be calculated according to Equation (3):

$$tokenFactor_{hops} = factor_{tokenHop}^{hopErrors_{token}} \quad (3)$$

where $factor_{tokenHop}$ can be configured to be 0.92 or other value; and $hopErrors_{token}$ represents the number of hop errors in the identified path for the token.

In some implementations, the token score can be represented by a product of the character factor and the hop factor, according to Equation (4) or a variation thereof:

$$tokenScore = tokenFactor_{errors} \times tokenFactor_{hops} \quad (4).$$

The token score can be otherwise configured as a sum or another function of the character factor and the hop factor.

At 350, whether a best possible path has been found or stop conditions have been met can be made. In some implementations, identifying a path within the reference string (e.g., 320) can start with different entry points (e.g. when the first character of the token appears more than once in the reference string). If the best path (e.g., a path with zero errors and no missing or surplus hops) is found, the example method 300 can proceed to 360 and no more alternatives are searched for. Otherwise, the example method 300 can go back to 320 and repeat until the best possible path is found per token or one of the stop conditions is met. The stop conditions include, among others, conditions that:

the number of errors exceed the number of allowed errors for that token,
no more input token characters left,
reached the end of the reference string,
reached into already assigned characters (strict-and), or
if a path reached a score that is less than the best score already attained.

Figure 4:
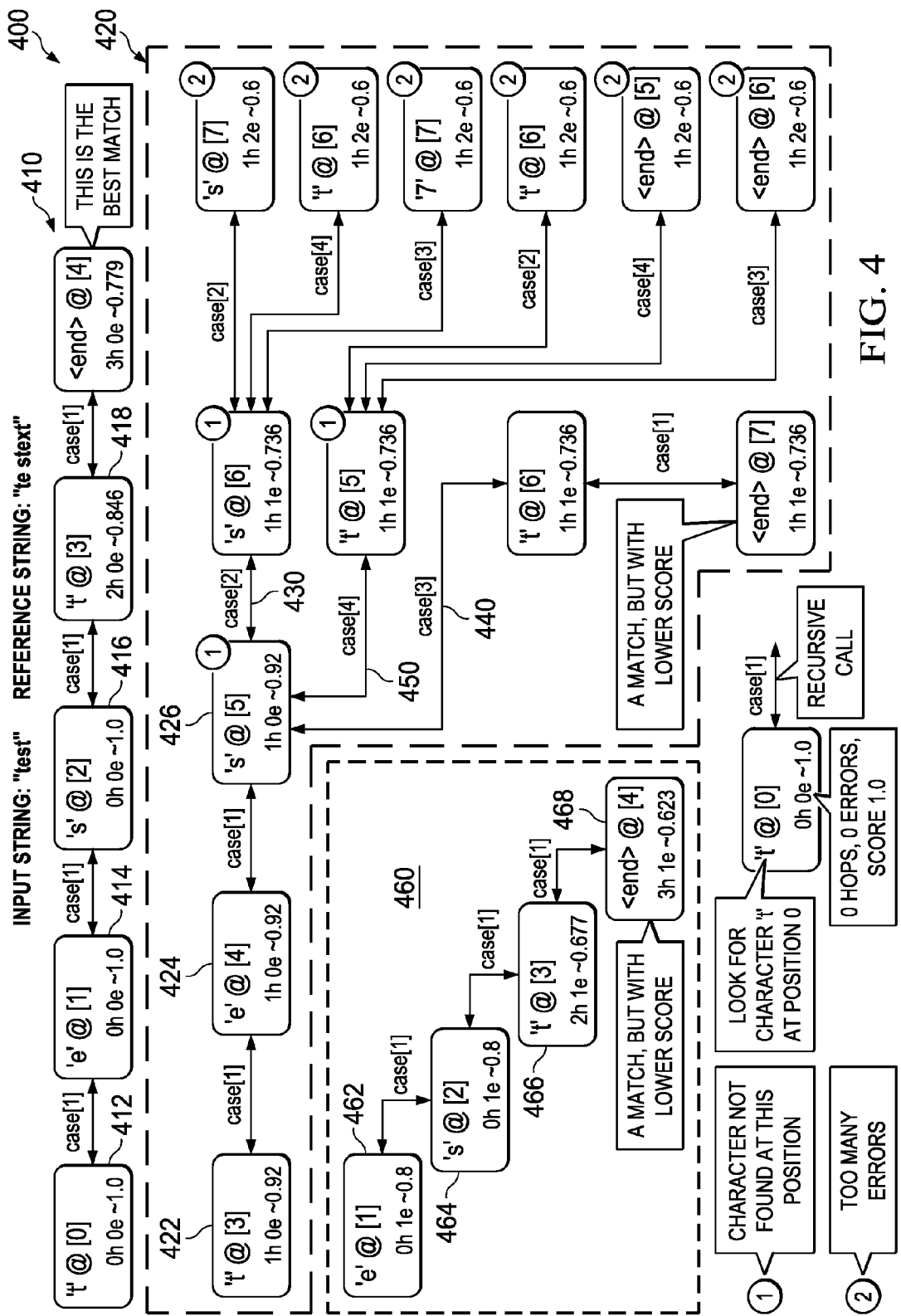
FIG. 4 is a flow diagram illustrating a method of identifying multiple paths within a reference string for a token of an input string.

FIG. 4 is a flow diagram 400 illustrating an example method of identifying multiple paths within a reference string for a token of an input string. In the illustrated example, the input string is "test" with only one input token "test," whereas the reference string is "te stext." Various paths can be identified within the reference string for the input token, for example, according the example techniques described at 320 of the example method 300. The number of hop errors, character errors, and a token score (collectively referred as a "record") of each path can be determined, recorded, and updated as the path proceeds, for example, according to the example techniques described at 330-350 of the example method 300. In some implementations, additional or different techniques can be used to identify a path and calculated a path score.

A first example path 410 starts with the first character "t" of the reference string "te stext" at character index value "0" at 412. At the initial state 412, the number of hop error of the current path is 0 (shown as "0h"); the number of character error is 0 (shown as "0e"); and the current token score of the path is "1" (shown as "~1.0"). At 412, the first character "t" of the token "test" is found at the current position (index value "0") of the reference string, with no hop error or character error. Thus the record of the path remains as "0h 0e~1.0" (shown in the next state 414 to reflect the resulting path record after the state 412) and the path 410 proceeds according to case[1] to the state 414 to look for the next character ("e") of the token at the next position (index value "1") of the reference string. Similarly, characters "s" and "t" are subsequently found at the next two positions of the reference values at 416 and 418. As such, the first example path 410 includes a sequence of increasing index values "0123" for corresponding to the four characters of the input token. However, there is a space between characters "e" and "s" and no separator after the second "t" of the reference string, which leads to two and one hop error, respectively. As a result, the example first path 410 has three hop errors, zero character error and a final token score of 0.779.

A second example path 420 starts with the fourth character "t" of the reference string "te stext" at character index value "3," which also matches the first character "t" of the token "test." At the initial state 422, a hop error occurs due to a missing separator before the character "t" in the reference string. Thus the initial record of the path at 422 is "1h 0e~0.92." Since the first character "t" of the token is found at the current position (index value "3") of the reference string at 422, the path 420 proceeds according to case[1] to state 424, where the next character ("e") of the token is found at the next position (index value "4") of the reference string again. No hop error or character error has been identified so far and the token score of the current path remains as 0.92 as shown at state 426. At the state 426, the current position (index value "5") of the reference string includes the character 's,' different from the next character 'x' of the token string. An error is identified and the example path 420 thus splits into three different paths 430, 440, and 450 according to case[2], case[3] and case[4] as described at 320 of the example method 300. Among the three paths 430-450, only the path 440 returns as a qualified path with a final token score of 0.736; the paths 430 and 450, each further splitting into multiple branches, fail to qualify because the numbers of errors exceed the number of allowed errors for the token.

Another example path 460 starts with the second character "e" of the reference string "te stext" at character index value "1," which matches the second character "e" of the token "test." In this case, the missing first character T of the input token is recognized as a character error and thus the initial record of the path is "0h 1e~0.8" at the initial state 460. According to the example techniques described at 320~350 of the example method 300, the final token score of the path 460 is 0.623 with three hop errors and one character error.

Among the multiple identified paths, the first example path 410 has the highest token score and can be identified as the best path. The token score of the path 410 can be used, for example, for calculating the similarity score of the reference string at 370 of the example method 300.

In some instances, there can be a lot of paths to follow within the reference string, especially when the reference string and the input string are long. The performance of example method 300 can be affected. In some implementations, a maximum number of allowed errors in the input token can be enforced to reduce the number of possible paths and hence improve the efficiency of the algorithm.

In general, the performance of the fuzzy substring search algorithm, for example, by the length of the reference string, the length of the input tokens, the number of errors in the input, the number of input tokens, the distribution of errors, the number of occurrences of input characters in the reference, non-ASCII characters, or other factors. In some implementations, techniques can be implemented to increase the performance, for example, by avoiding paths that are not useful and/or to break paths when it is not useful to follow them further. Other example techniques to improve performance can include caching and reusing the results of already committed ways. The cache can be activated only when a token has, say, five or more allowed errors. In addition, the limitations of input tokens to have at most 100 characters and at most 8 allowed errors are also example techniques to improve the performance of the algorithm and these parameters can be otherwise configured based on performance needs.

Referring back to FIG. 3, at 360, whether all tokens of the input string have been traversed can be determined. For example, for the input string "albia city," there are two input tokens. If the best possible paths for both two tokens have been identified, the example method 300 proceeds to 370. Otherwise, the example method 300 proceeds to 310 to identify another token of the input string. For the example input string "test," there is only one token. Once the best possible path for the token "test" has been identified at 350, it can be determined all the tokens of the input string have been reached at 360, the example method 300 proceeds to 370.

At 370, a similarity score of the reference string relative to the input string is calculated based on the token score for each token of the input string. In some implementations, the token score can be the score of the best path within the reference string for each input token. In some instances, a length factor can be taken into account in calculating the similarity score to account for the length difference between the identified path and the token. The length factor can be calculated once for each input string, for example, according to Equation (5):

$$factor_{length} = length_{base} + \frac{length_{shorter}}{length_{longer}} \times (1 - length_{base}) \quad (5)$$

where $length_{base}$ can be configured to be 0.95 or another value, $length_{shorter} \triangleq$ length of the shorter string of input and reference $length_{longer} \triangleq$ length of the longer string of input and reference.

The similarity score of the reference string can be calculated, for example, according to Equation (6):

$$score = \left(\frac{\sum_{i=1}^{n}(tokenFactor_{errors_i} \times tokenFactor_{hops_i})}{n}\right) \times factor_{length} \quad (6)$$

where $n \triangleq$ number of input tokens of the input string.

For the example input string "albia city" and reference string "albion city," the character factor $t_1$ and hop factor $h_1$ for the first token "albia," according to Equations (2) and (3), are:

$t_1 = 0.8 + (1-1/1) \times (1-0.8) = 0.8$ $h_1 = 0.92^1 = 0.92$.

The character factor $t_2$ and hop factor $h_2$ for the second token "city," are:

$t_2 = 0.8 + (1-0/1) \times (1-0.8) = 1.0$ $h_2 = 0.92^0 = 1.0$

The length factor according to Equation (5) is:

$f = 0.95 + 10/11 \times (1-0.95) = 0.995$.

And the similarity score of the reference string, according to Equation (6) is $$score = \left(\frac{0.8 \times 0.92 + 1.0 \times 1.0}{2}\right) \times 0.995 = 0.864.$$

For the example input string "test" and reference string "te stext," the character factor $t_1$ and hop factor $h_1$ for the only token "test" are $t_1 = 0.8 + (1-0/1) \times (1-0.8) = 1.0$ $h_1 = 0.92^3 = 0.779$.

The length factor is:

$f = 0.95 + \frac{4}{5} \times (1-0.95) = 0.975$

The similarity score is:

$$score = \left(\frac{1.0 \times 0.779}{1}\right) \times 0.975 = 0.76.$$

As such, the resulting similarity score of the reference string relative to the input string depends on the character errors, the missing or surplus hops, and the difference in the lengths of input and reference strings. Additional or different factors can be considered. In some implementations, the weights for these factors can be the same or different. In some implementations, the weights can be adjusted, for example, to distinguish different errors and select the research result based on certain errors. For example, the weights can be adjusted (e.g., by changing the base value or adding a scalar) to penalize hop errors more than character errors, length errors more than hop error, or vice versa. The weights can be constant values or can be adjusted based on, for example, user's configurations, system requirements, etc. from application to application.

Referring now to FIG. 2, after calculating the similarity score of each reference string based on the character index values and hop index values, at 260, the similarity scores of the reference strings can be output. The similarity scores can be output, for example, by the search engine 107 to the client application 146. In some implementations, the similarity scores of the reference strings are compared with a certain threshold or compared with each other; and only the similarity scores that are above a threshold or a certain number of top similarity scored are output. In some implementations, the IDs of the references strings or the reference strings themselves can be output together with the respective similarity scores. The similarity scores, the IDs, and the reference strings can be used by another client application, server application, and/or can be displayed, for example, via a user interface of the client 140 to the user.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multitouch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
    determining, by operation of a hardware processor, a plurality of tokens of an input string received from a client application;
    identifying, from a database, a reference string based on the plurality of tokens of the input string;
    determining a plurality of character index values of the reference string, each character index value indicating a position of a character in the reference string;
    determining one or more hop index values of the input string, each hop index value indicating a position of a separator in the input string; and calculating a similarity score of the reference string relative to the input string based on the plurality of character index values of the reference string and the one or more hop index values of the input string, wherein calculating the similarity score of the reference string relative to the input string comprises:

identifying a path within the reference string corresponding to each of the plurality of tokens of the input string;

calculating a token score of the path, wherein calculating a token score of the path comprises:

identifying a number of character errors and a number of hop errors of the path within the reference string relative to the token of the input string; and calculating the token score of the path based on the number of character errors and the number of hop errors; and calculating the similarity score of the reference string based on the token score of the path, wherein the similarity score is used to sort and select the best reference string for each input string.

2. The method of claim 1, comprising, for each of the plurality of tokens of the input string, storing the token itself, a character length of the token, a number of allowed errors for the token, or a flag to indicate whether the token is truncated.

3. The method of claim 1, wherein identifying a reference string comprises selecting a plurality of reference strings from the database based on the plurality of tokens of the input string.

4. The method of claim 1, wherein identifying a path comprises identifying a sequence of character index values of the reference string corresponding to characters of the token.

5. The method of claim 1, wherein identifying a path corresponding to each of the plurality of tokens of the input string comprises:

identifying a plurality of paths within the reference string for each of the plurality of tokens in the input string;

calculating a score for each of the path; and selecting a path with the best score among the plurality of paths.

6. A non-transitory, computer-readable medium storing computer-readable instructions executable by a computer and configured to:

determine a plurality of tokens of an input string received from a client application;

identify, from a database, a reference string based on the plurality of tokens of the input string;

determine a plurality of character index values of the reference string, each character index value indicating a position of a character in the reference string;

determine one or more hop index values of the input string, each hop index value indicating a position of a separator in the input string; and calculate a similarity score of the reference string relative to the input string based on the plurality of character index values of the reference string and the one or more hop index values of the input string, wherein calculating the similarity score of the reference string relative to the input string comprises:

identifying a path within the reference string corresponding to each of the plurality of tokens of the input string;

calculating a token score of the path, wherein calculating a token score of the path comprises:

identifying a number of character errors and a number of hop errors of the path within the reference string relative to the token of the input string; and calculating the token score of the path based on the number of character errors and the number of hop errors; and calculating the similarity score of the reference string based on the token score of the path, wherein the similarity score is used to sort and select the best reference string for each input string.

7. The medium of claim 6, comprising instructions to, for each of the plurality of tokens of the input string, store the token itself, a character length of the token, a number of allowed errors for the token, or a flag to indicate whether the token is truncated.

8. The medium of claim 6, wherein identifying a reference string comprises selecting a plurality of reference strings from the database based on the plurality of tokens of the input string.

9. The medium of claim 6, wherein identifying a path comprises identifying a sequence of character index values of the reference string corresponding to characters of the token.

10. The medium of claim 6, wherein identifying a path corresponding to each of the plurality of tokens of the input string comprises:

identifying a plurality of paths within the reference string for each of the plurality of tokens in the input string;

calculating a score for each of the path; and selecting a path with the best score among the plurality of paths.

11. A system, comprising:

a memory; at least one hardware processor interoperably coupled with the memory and configured to:

determine a plurality of tokens of an input string received from a client application;

identify, from a database, a reference string based on the plurality of tokens of the input string;

determine a plurality of character index values of the reference string, each character index value indicating a position of a character in the reference string;

determine one or more hop index values of the input string, each hop index value indicating a position of a separator in the input string; and calculate a similarity score of the reference string relative to the input string based on the plurality of character index values of the reference string and the one or more hop index values of the input string, wherein calculating the similarity score of the reference string relative to the input string comprises:

identifying a path within the reference string corresponding to each of the plurality of tokens of the input string;

calculating a token score of the path, wherein calculating a token score of the path comprises:

identifying a number of character errors and a number of hop errors of the path within the reference string relative to the token of the input string; and calculating the token score of the path based on the number of character errors and the number of hop errors; and calculating the similarity score of the reference string based on the token score of the path, wherein the similarity score is used to sort and select the best reference string for each input string.

12. The system of claim 11, configured to, for each of the plurality of tokens of the input string, store one or more of the token itself, a character length of the token, a number of allowed errors for the token, or a flag to indicate whether the token is truncated.

13. The system of claim 11, wherein identifying a reference string comprises selecting a plurality of reference strings from the database based on the plurality of tokens of the input string.

14. The system of claim 11, wherein identifying a path corresponding to each of the plurality of tokens of the input string comprises:
   identifying a plurality of paths within the reference string for each of the one or more tokens in the input string;
   calculating a score for each of the path; and
   selecting a path with the best score among the plurality of paths.

15. The system of claim 11, wherein identifying a path comprises identifying a sequence of character index values of the reference string corresponding to characters of the token.

* * * * *